(12) United States Patent
Stuhldreher et al.

(10) Patent No.: US 11,636,382 B1
(45) Date of Patent: Apr. 25, 2023

(54) ROBOTIC SELF PROGRAMMING VISUAL INSPECTION

(71) Applicant: Textron Aviation Inc., Wichita, KS (US)

(72) Inventors: Micah James Stuhldreher, Wichita, KS (US); Darren Fair, Newton, KS (US)

(73) Assignee: Textron Innovations, Inc., Providence, RI (US)

(*) Notice: Subject to any disclaimer, the term of this patent is extended or adjusted under 35 U.S.C. 154(b) by 764 days.

(21) Appl. No.: 16/531,558

(22) Filed: Aug. 5, 2019

Related U.S. Application Data

(60) Provisional application No. 62/718,009, filed on Aug. 13, 2018, provisional application No. 62/717,135, filed on Aug. 10, 2018.

(51) Int. Cl.
| | |
|---|---|
| *B25J 9/16* | (2006.01) |
| *G06N 20/00* | (2019.01) |
| *G06T 7/00* | (2017.01) |
| *G06T 1/00* | (2006.01) |
| *B25J 19/02* | (2006.01) |
| *G06K 7/14* | (2006.01) |

(52) U.S. Cl.
CPC ............. *G06N 20/00* (2019.01); *B25J 9/163* (2013.01); *B25J 9/1669* (2013.01); *B25J 9/1697* (2013.01); *B25J 19/02* (2013.01); *G06K 7/1413* (2013.01); *G06T 1/0014* (2013.01); *G06T 7/001* (2013.01); *G06T 2207/20081* (2013.01); *G06T 2207/30108* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,985,846 A | * | 1/1991 | Fallon .................... | B25J 9/1697 382/153 |
| 5,499,306 A | * | 3/1996 | Sasaki ................ | G06V 10/7515 382/153 |
| 5,521,843 A | * | 5/1996 | Hashima ................. | G06T 7/246 382/103 |
| 5,579,444 A | * | 11/1996 | Dalziel .................. | B25J 9/1697 382/153 |
| 8,634,950 B2 | * | 1/2014 | Simonetti ............ | G05B 19/402 700/192 |

(Continued)

*Primary Examiner* — Jonathan L Sample
(74) *Attorney, Agent, or Firm* — Avek IP, LLC

(57) ABSTRACT

A robotic self-learning visual inspection method includes determining if a fixture on a component is known by searching a database of known fixtures. If the fixture is unknown, a robotic self-programming visually learning process is performed that includes determining one or more features of the fixture and providing information via a controller about the one or more features in the database such that the fixture becomes known. When the fixture is known, a robotic self-programming visual inspection process is performed that includes determining if the one or more features each pass an inspection based on predetermined criteria. A robotic self-programming visual inspection system includes a robot having one or more arms each adapted for attaching one or more instruments and tools. The instruments and tools are adapted for performing visual inspection processes.

17 Claims, 4 Drawing Sheets

(56) References Cited

U.S. PATENT DOCUMENTS

| | | | | |
|---|---|---|---|---|
| 9,333,649 | B1* | 5/2016 | Bradski | G06T 19/003 |
| 9,669,543 | B1* | 6/2017 | Stubbs | B25J 9/1612 |
| 10,059,002 | B2* | 8/2018 | Miyatani | G06V 10/993 |
| 10,086,514 | B2* | 10/2018 | Fair | B25J 9/1687 |
| 10,981,272 | B1* | 4/2021 | Nagarajan | B25J 9/1669 |
| 2008/0181485 | A1* | 7/2008 | Beis | B25J 9/1697 |
| | | | | 382/209 |
| 2013/0215260 | A1* | 8/2013 | Drescher | G01N 21/8806 |
| | | | | 348/92 |
| 2013/0346348 | A1* | 12/2013 | Buehler | G06F 17/00 |
| | | | | 901/31 |
| 2014/0300729 | A1* | 10/2014 | Drescher | G01N 21/95692 |
| | | | | 348/92 |
| 2015/0003678 | A1* | 1/2015 | Watanabe | G06T 19/20 |
| | | | | 382/103 |
| 2015/0224649 | A1* | 8/2015 | Watanabe | G05B 19/4083 |
| | | | | 700/259 |
| 2016/0005161 | A1* | 1/2016 | Aiso | G06T 7/194 |
| | | | | 382/153 |
| 2016/0167228 | A1* | 6/2016 | Wellman | B25J 9/1602 |
| | | | | 901/3 |
| 2016/0232654 | A1* | 8/2016 | Suzuki | B25J 9/1697 |
| 2016/0349730 | A1* | 12/2016 | Fair | B25J 9/1612 |
| 2018/0126553 | A1* | 5/2018 | Corkum | B25J 9/1697 |
| 2018/0221966 | A1* | 8/2018 | Szarski | B23B 35/00 |
| 2019/0035067 | A1* | 1/2019 | Yamamoto | H04N 5/76 |
| 2019/0217477 | A1* | 7/2019 | Paepcke | G06Q 30/06 |
| 2020/0038108 | A1* | 2/2020 | Chou | A61B 34/10 |

* cited by examiner

ROBOTIC SELF PROGRAMMING VISUAL INSPECTION

CROSS-REFERENCE TO RELATED APPLICATIONS

This application claims the benefit of U.S. Provisional Application No. 62/717,135 entitled "Robotic Self Programming Visual Inspection" and filed on Aug. 10, 2018, and U.S. Provisional Application No. 62/718,009 entitled "Robotic Self Programming Visual Inspection" and filed on Aug. 13, 2018, which are herein incorporated by reference in their entirety.

BACKGROUND

1. Field

Embodiments of this disclosure relate generally to the field of quality inspection, and more specifically to robotic visual inspection.

2. Description of the Related Art

Robotics have long been used in the manufacturing process of a variety of products. It is also known to use metrological techniques to measure physical characteristics of the part during production, so that a robotic system can orient a part so that that part can be processed in some way.

One example of such an arrangement is discussed in U.S. Pat. No. 8,634,950 issued to Simonetti et al. Simonetti discloses a technique wherein a portion of an aircraft fuselage is lined up with an adjacent fuselage section. The original portion is loaded on a support or dolly that is attached to the robotic arm, then metrology techniques (e.g., using optical sensors) are used to create a geometric model, and a center point for the part is determined using the model. The model center point is then conformed to the robot tool center point, and this is used to match up the two fuselage sections so that they are in alignment and will fit together properly.

Another example is discussed in U.S. Pat. No. 10,086,514 issued to Fair et al. Fair discloses a system and method for processing an aircraft component in which a robot retrieves camera images of a component and determines position offsets of features on the component based on a comparison between the images and a computer model of the component. The method then determines a path offset for the robot to move based on the position offsets.

SUMMARY

In an embodiment, a robotic self-learning visual inspection method includes determining, via a controller, if a fixture on a component is known by searching a database of known fixtures. If the fixture is unknown, a robotic self-programming visually learning process is performed that includes determining one or more features of the fixture and providing information via the controller about the one or more features in the database such that the fixture becomes known. When the fixture is known, a robotic self-programming visual inspection process is performed that includes determining if the one or more features each pass an inspection based on predetermined criteria.

In another embodiment, a robotic self-programming visual inspection system includes a robot having one or more arms each adapted for attaching one or more of a plurality of instruments and tools. The plurality of instruments and tools are adapted for performing a plurality of visual inspection processes, respectively. A controller is provided that has non-volatile memory for storing software and a processor for executing instructions of the software. The instructions are adapted to instruct the robot to perform the plurality of visual inspection processes.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

During manufacturing of parts, defects need to be identified early in the manufacturing process to avoid costly failures that are otherwise not identified until later stages of manufacture. For example, for parts requiring a metal bond layup, detection of defects in the bond may be difficult to identify prior to a heating step of bonding (e.g., in an autoclave). Embodiments of the present disclosure include a robot that generates its own path and inspection routine for each part being inspected. The robot is capable of navigating around parts placed in front of it while identifying all inspectable features on its own. The robot generates a three-dimensional (3D) model of each part to allow safe travel through complex parts and as a way to convert two-dimensional (2D) image information into 3D spatial information. Embodiments of the present disclosure also provide automated methods for inspecting features of parts and for learning new parts to be inspected.

Figure 1:
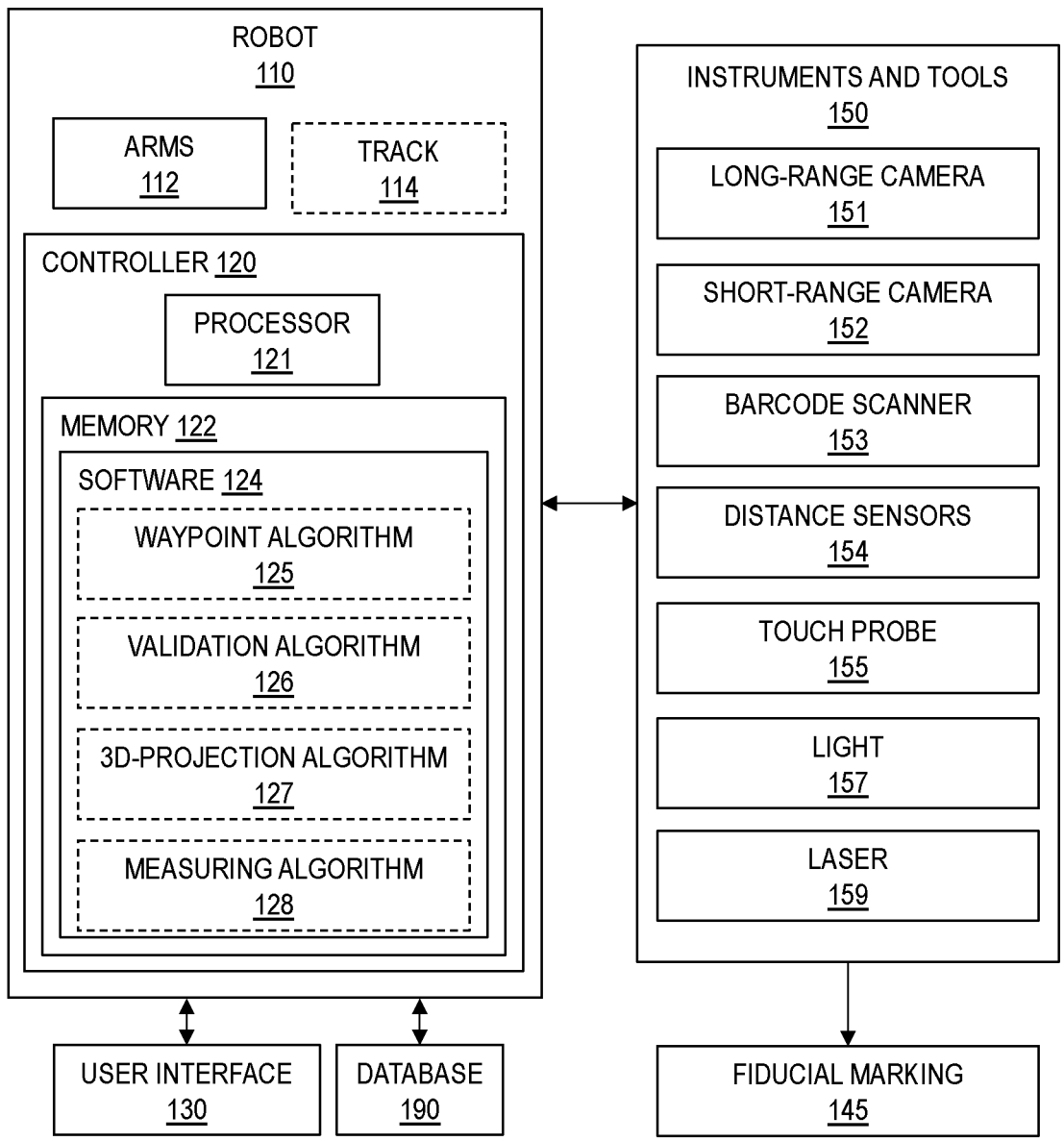
FIG. 1 is a block diagram of a robotic self-programming visual inspection system, in an embodiment.

FIG. 1 is a block diagram of an exemplary robotic self-programming visual inspection system 100 including a robot 110. Robot 110 is for example a six-axis robot that includes one or more arms 112 used to position instruments and an optional track 114 mounted to a floor for moving along. A controller 120 provides control of the one or more arms 112 and movement of robot 110 (e.g., along track 114), as well as control of a plurality of instruments and tools 150 used by robot 110. The plurality of instruments and tools 150 may include but are not limited to a long-range camera 151, a short-range camera 152, a barcode scanner 153, one or more distance sensors 154, a touch probe 155, a light 157, and a laser 159.

Controller 120 includes a memory 122 for storing software 124 having machine readable instructions executed by a processor 121. Controller 120 is for example one or more of a computer, a microcontroller, a programmable logic controller (PLC), and a programmable automation controller, coupled with control circuitry, such as one or more printed circuit boards for example. Memory 122 in some embodiments is a memory system that includes both transitory memory such as RAM and non-transitory memory such as, ROM, EEPROM, Flash-EEPROM, magnetic media including disk drives, and optical media. Memory 122 stores software 124 as machine readable instructions executable by processor 121 to control robot 110 and the plurality of instruments 150 integrated with robot 110. For example, software 124 may provide instructions to process image data from long-range camera 151 and short-range camera 152. Exemplary instructions may include a waypoint algorithm 125, a validation algorithm 126, and a 3D-projection algorithm 127, and a measuring algorithm 128, which are further described below in connection with FIGS. 3 and 4.

A user interface 130 is communicatively coupled with controller 120 to enable a user to provide input and receive information from robot 110 via controller 120. User interface 130 may include a display communicatively coupled with an input device such as a mouse, keyboard, microphone, or touchscreen.

A database 190 is communicatively coupled with controller 120 for storing data including reference files, lookup tables, computer-aided design (CAD) files, computational models, solid models, etc. Controller 120 and/or database 190 may each include a transceiver for transmitting and receiving data by a wired and/or wireless communication media.

Robotic self-programming visual inspection system 100 is adapted to interact with a fixture for learning traits of the fixture and for inspecting features of the fixture, as further described below in connection with FIGS. 2-4. A fixture may be a portion of a component or part being manufactured. For example, the fixture may include a bond, fastener, component edge or corner. A feature is any object (e.g., a slider, header-board, bolt, bolt slot, fastener edge) or layup pattern (e.g., seam, bond, overlap) that has been imaged (e.g., via short-range camera 152). The images are uploaded to controller 120 for inspection. Features may include measurable qualities that may be determined by controller 120 based on measurements obtained using one or more of instruments and tools 150. Some features may be described by controller 120 (e.g., based on their position, rotation, and size) without requiring additional input by the user.

Long-range camera 151 is for example a high-resolution digital camera (e.g., twenty-one megapixels) with a lens set to focus at a longer distance compared to that of short range camera 152. The longer distance may be between about 600 mm to about 1000 mm. In certain embodiments, the longer distance is about 800 mm. Long-range camera 151 also provides a relatively large field-of-view and a relatively large depth-of-field compared to that of short range camera 152 for capturing large portions of a part or component within focus. Long-range camera 151 may be used to capture a plurality of features within an image.

Short-range camera 152 is for example a digital camera set to focus at a shorter distance compared to long-range camera 151. The shorter distance may be a distance between about 50 mm to about 550 mm. In certain embodiments, the shorter distance is about 500 mm. Short-range camera 152 provides a higher pixel/millimeter ratio compared to long-range camera 151. Therefore, short-range camera 152 may be used for imaging a smaller portion of a part or component, such as a single feature, to provide a higher level of detail. Robot 110 may automatically move short-range camera 152 to a distance from the feature being imaged such that the camera is in focus.

A barcode scanner 153 is for example an infrared scanner adapted to scan one-dimensional (1D) or 2D barcodes. In certain embodiments, barcode scanner 153 is a handheld device with a dedicated charging/docking station (e.g., located adjacent user interface 130).

Distance sensors 154 may include a plurality of optical sensors that provide means of detection and ranging of nearby objects. For example, a laser may be used to illuminate nearby objects and a detector may be used to receive laser light reflected off of the nearby objects. The laser may include one or more lasers for emitting collimated light within a narrow wavelength spectrum (e.g., infrared light). In certain embodiments, the laser may be used to produce short pulses of light. In some embodiments, the detector is a photodetector (e.g., a photodiode) that receives laser light within a predetermined wavelength spectrum (e.g., by using filters). In some embodiments, distance sensors 154 include four pairs of lasers and photodetectors, but greater than four or fewer than four sensor pairs may be employed without departing from the scope hereof.

Distance measurements (e.g., ranging) may be performed using time-of-flight measurements. For example, one or more pulses of laser light are emitted by the laser, and each pulse reflects off of nearby objects. The reflections may be received by the detector. The amount of time between the pulse emitted and the reflection received is used to determine a distance between one of distance sensors 154 and an object based on the speed of light. Distance measurements may be coupled with camera images for determining the size of objects and fixtures in the camera images by controller 120.

Touch probe 155 may be attached to one of arms 112 for touching an object such as a fixture. Touch probe 155 may be adapted to slide or roll along a contour of the object, under control of controller 120, for establishing a detailed profile of a surface and/or to determine rotation values (e.g., roll, pitch, and yaw) of the fixture.

Light 157 is for example a ring light, such as a quadrant ring light having four quadrant zones that may be individually turned on/off (e.g., by controller 120 or manually by an operator) for reducing glare.

Laser 159 is for example a laser pointer producing collimated light at a wavelength within the visible spectrum. Laser 159 is attached to one of arms 112 for illuminating a portion of an object such as a fixture under control of controller 120. If a failure on a fixture is identified, laser 159 may illuminate the location of the failure making the location of the failure known to an operator, as further described below in connection with an inspection method 400, FIG. 4.

In operation, a user logs in (e.g., via user interface 130 or by scanning an employee badge with barcode scanner 153). In certain embodiments, upon recognition of the user, robot 110 prompts the user to begin a calibration process, a home-movement process, and a fixture-interaction method 200 (FIG. 2). The calibration process calibrates cameras 151, 152, distance sensors 154, and touch probe 155 to ensure they are relaying correct measurements. The home-movement process simply returns robot 110 to a safe default position such that it is clear of personnel and incoming fixtures. The fixture-interaction method 200 is described below in connection with FIG. 2. Following method 200, the user may be prompted via user interface 130 to proceed with a learning method 300, FIG. 3 and/or inspection method 400, FIG. 4, as further described below.

Figure 2:
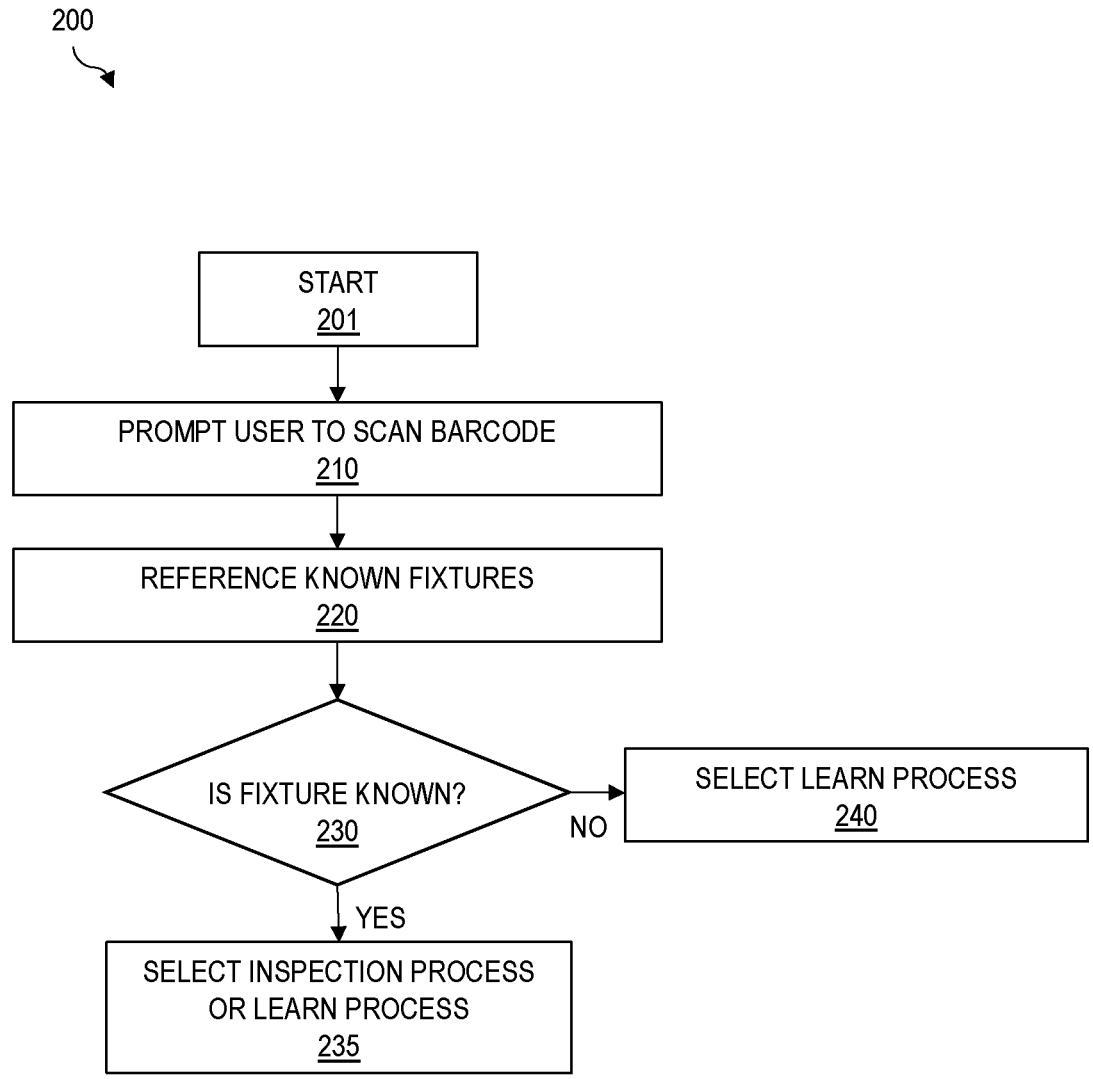
FIG. 2 is a block diagram showing steps of a robotic fixture-interaction method, in an embodiment.

FIG. 2 is a block diagram showing steps of an exemplary robotic fixture-interaction method 200.

In a step 201, the method is started. In an example of step 201, method 200 is selected for initiation by an operator via a user interface 130, FIG. 1.

In a step 210, a user is prompted to scan a barcode. In an example of step 210, user interface 130 prompts the user to scan a barcode attached to a fixture with barcode scanner 153, FIG. 1. In certain embodiments, barcode scanner 153 is an infrared barcode scanner.

In a step 220, known fixtures are referenced. In an example of step 220, robot 110 searches database 190 for known fixtures. The known fixtures may have previously become known by robot 110 via learning method 300, FIG. 3, for example.

A step 230 is a decision. If robot 110 finds a matching fixture in database 190, method 200 proceeds with step 235. Otherwise, method 200 proceeds with step 240.

In a step 235, either an inspection process or a learn process is selected. In an example of step 235, user interface 130 presents options for learn method 300, FIG. 3 and inspection method 400, FIG. 4, and the user selects one method via user interface 130. If the current fixture is a reference fixture in database 190, the user may opt to skip learning method 300 and proceed directly to inspection method 400. However, in some circumstances in which measured data may have changed (e.g., if a feature was added or removed from the fixture), a "re-learn" of the fixture may be needed, in which case the user selects the learn process in step 235. In some embodiments, user interface 130 only accepts selection of the learn process in step 235 for select users of system 100 (e.g., a process engineer).

In a step 240, a learn process is selected. In an example of step 240, the user selects learn method 300, FIG. 3 via user interface 130. When the current fixture is not a reference fixture in database 190, the inspection method 400 may not proceed without first performing learn method 300. In this circumstance, user interface 130 presents learn method 300 as the sole option.

Figure 3:
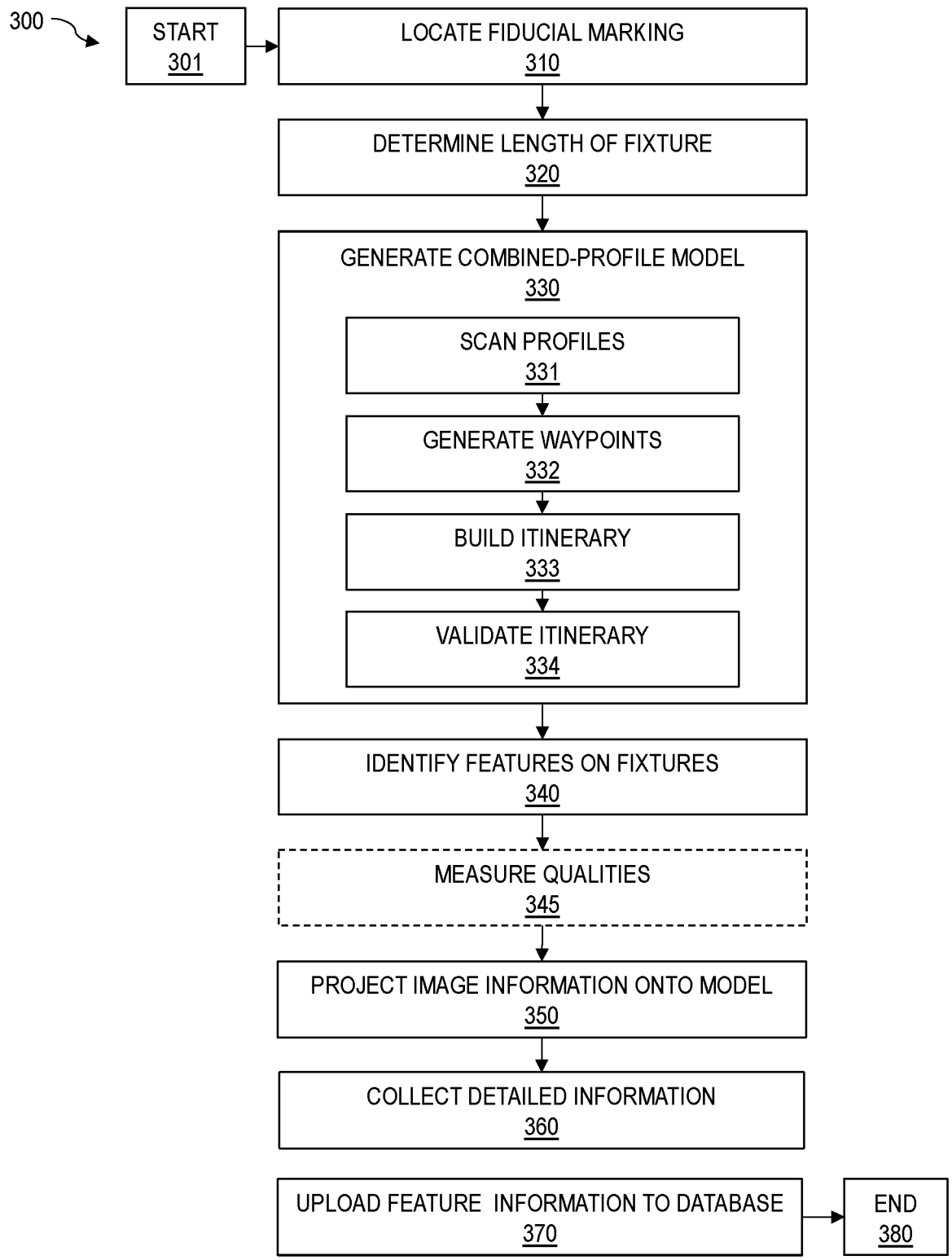
FIG. 3 is a block diagram showing steps of a robotic self-programming visual learning method, in an embodiment.

FIG. 3 is a block diagram showing steps of an exemplary robotic self-programming visual learning method 300.

In a step 301, the method is started. In an example of step 301, method 300 is selected for initiation by an operator via user interface 130, FIG. 1.

In a step 310, a fiducial marking is located. In an example of 310, robot 110 uses long-range camera 151 to scan the component in search of fiducial marking 145, FIG. 1. Fiducial marking 145 is an identifier that has been preplaced on the component to identify a particular fixture. An example of fiducial marking 145 is a sticker having a barcode. The barcode may be a one-dimensional or two-dimensional barcode that is scannable with barcode scanner 153 or a camera, for example.

While searching for the fiducial marking, the robot may move long-range camera 151 (e.g., rotate, tilt, and/or translate along track 114) to provide several views of the component. In certain embodiments, after fiducial marking 145 is located, robot 110 approaches the marking and captures close-up images using short-range camera 152. Robot 110 determines a path offset from fiducial marking 145 to a base frame of robot 110. A position for all fixtures of the component to be found may be referenced to the location of fiducial marking 145. In some embodiments, robot 110 uses touch probe 155 to touch the fixture (e.g., to physically scan one or more surfaces of the fixture for obtaining a detailed profile of the surface).

In a step 320, a length of the fixture is determined. In an example of step 320, robot 110 positions one or more distance sensors 154 above the fixture and uses the one or more distance sensors 154 to determine the fixture length. In certain embodiments, the one or more distance sensors 154 is/are used to identify the ground as a reference location on opposite sides of the fixture.

In a step 330, a combined-profile model is generated. In an example of step 330, robot 110 generates a combined-profile model. The combined profile-model is a computational model that characterizes a fixture using a plurality of profiles based on a corresponding plurality of sections of the fixture, as further described below. Step 330 may include one or more of the following sub-steps 331, 332, 333, and 334.

In a sub-step 331, a plurality of profiles are scanned. In an example of sub-step 331, robot 110 determines a plurality sections of the fixture along a longitudinal direction of the fixture, with each of the sections having the same length. Robot 110 then traverses the fixture at each of the plurality of sections along a transverse direction, perpendicular to the longitudinal direction, and scans the width of the sections using distance sensor 154 to collect distance profiles.

In a sub-step 332, waypoints are generated. In an example of step 332, robot 110 generates a plurality of waypoints based on the scanned distance profiles collected in sub-step 331 using a waypoint algorithm 125 stored in memory 122. The waypoints ensure robot 110 is able to capture each section of the fixture using long-range camera 151.

In a sub-step 333, an itinerary is built. In an example of step 333, robot 110 builds an itinerary to provide safe travel for movement by robot 110 near the fixture. The itinerary may be based on the waypoints generated in sub-step 332.

In a sub-step 334, the itinerary is validated. In an example of step 334, robot 110 validates the itinerary using a validation algorithm 126 stored in memory 122. In certain embodiments, validation algorithm 126 ensures that the waypoints generated in sub-step 332 are reachable by one of arms 112 of robot 110. In some embodiments, validation algorithm 126 ensures that the order of the waypoints is correct such that the itinerary does not skip any waypoints.

In a step 340, features on a fixture are identified. In an example of step 340, robot 110 identifies features on the fixture for which the combined-profile model was generated in step 330. Robot 110 moves from one waypoint to the next and occasionally stops to capture images of the fixture using long-range camera 151. Controller 120 analyzes the images to determine the type of feature present (e.g., a slider, header-board, bolt, bolt slot, fastener edge, seam, bond, overlap). In some embodiments, a position in space (e.g., an x, y, z, coordinate) of a feature is determined.

In an optional step 345, qualities of the feature are measured. In an example of step 345, features having measurable qualities (e.g., physical dimensions) may be measured using one or more of instruments and tools 150 based on a measuring algorithm 128, FIG. 1.

In a step 350, information extracted from captured images of the fixture is projected onto the combined-profile model to provide three-dimensional (3D) coordinate information of the feature. In an example of step 350, robot 110 executes 3D-projection algorithm 127 when a feature is identified (e.g., in step 340). 3D-projection algorithm 127 projects two-dimensional (2D) image information from long-range camera 151 onto the generated model to provide 3D coordinate information of the features. 3D-projection algorithm 127 enables controller 120 to determine a distance of a feature even if the image (e.g., from long-range camera 151) is not within perfect focus (e.g., slightly blurry).

In a step 360, detailed information is collected. In an example of step 360, robot 110 approaches each feature individually and captures higher detail images using short-range camera 152. A type of information collected may depend on the type of feature. For example, for a slider, a position of a shoulder bolt and a length of a corresponding bolt slot may be measured based on the higher detail images.

In a step 370, feature information is uploaded to a database. In an example of step 370, feature information collected in steps 340 through 360 is uploaded to database 190, FIG. 1.

In a step 380, the learning method 300 ends. In an example of step 380, robot 110 returns to its home position.

In certain embodiments, an operator may pause the learning method 300 via user interface 130 to manually enter tolerance information for the current feature being examined.

Figure 4:
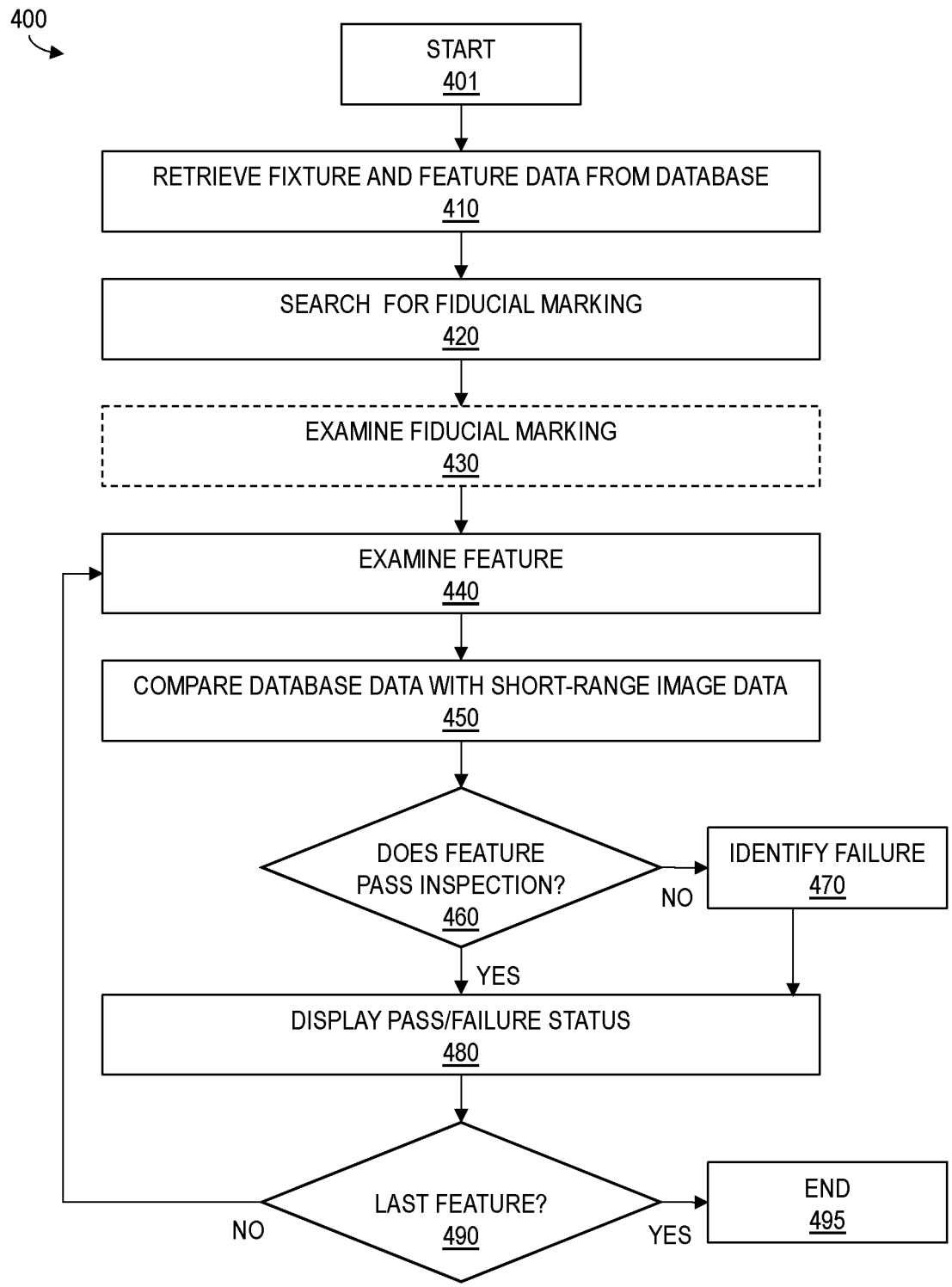
FIG. 4 is a block diagram showing steps of an exemplary robotic self-programming visual inspection method, in an embodiment.

FIG. 4 is a block diagram showing steps of an exemplary robotic self-programming visual inspection method 400.

In a step 401, the method is started. In an example of step 401, method 400 is selected for initiation by an operator via a user interface 130, FIG. 1.

In a step 410, data are retrieved from a database. In an example of step 410, robot 110 retrieves relevant fixture data and feature data from database 190, FIG. 1. Fixture data may include known reference fixture data for a plurality of fixtures as determined via fixture-interaction method 200, FIG. 2, for example. Feature data may include qualities measured in step 345 of learning method 300, FIG. 3, for example. In certain embodiments, fixture data includes a combined-profile model generated in step 330, FIG. 3.

In a step 420, a search for a fiducial marking is performed. In an example of step 420, robot 110 searches for a fiducial marking using long-range camera 151, FIG. 1. Robot 110 may move (e.g., along a predetermined track) until the fiducial marking is located. In some embodiments, step 420 is repeated for a plurality of features each having a unique fiducial marking.

In an optional step 430, the fiducial marking is examined. In an example of step 420, robot 110 approaches the fiducial marking closely and acquires images using short-range camera 152, FIG. 1. All positional and rotational data of the feature may be referenced to the frame of the fiducial marking. In some embodiments, step 430 is repeated for a plurality of features each having a unique fiducial marking.

In a step 440, a feature is examined. In an example of step 440, controller 120 processes images from short-range camera 152 and finds measured locations in the images. For example, location coordinates and groups of pixels of interest may be determined and stored in memory 122 for future reference.

In a step 450, database data is compared to image data. In an example of step 450, controller 120 compares database data (e.g., data retrieved in step 410) to short-range image data (e.g., from images acquired in step 440).

A step 460 is a decision to determine if a feature passes inspection. In an example of step 460, controller 120 determines whether or not a feature passes inspection based on the comparison between database data and image data performed in step 450 in view of predetermined criteria. The predetermined criteria may include a limit (e.g., a tolerance) used to determine pass/fail status. For example, if a feature is out of position by more than the limit/tolerance then a fail status is granted. As used herein, "limit" may mean a value, ratio, equation, or other expression. In certain embodiments, the limit may be predetermined, set, fixed, or variable.

If the feature fails inspection, method 400 proceeds with step 470. If the feature passes inspection, method 400 proceeds with step 480.

In a step 470, a failure is identified. In an example of step 470, user interface 130 indicates to the user that a failure has been identified. In certain embodiments, method 400 pauses when a failure is identified. Method 400 may be paused automatically via robot 110 or by the operator via user interface 130. In some embodiments, robot 110 uses laser 159 to illuminate the failure location on the component. Robot 110 may move away from the component while maintaining illumination of the failure location via laser 159 (e.g., to enable the operator sufficient space to visually inspect the failure location). The user may activate light 157 via user interface 130 to illuminate the feature for improving its visibility.

In a step 480, a pass/failure status is displayed. In an example of step 480, robot 110 displays the pass/failure status via user interface 130, FIG. 1.

A step 490 is a decision to determine whether or not the most recently inspected feature is the last feature of the component to be inspected. If additional features remain to be inspected, method 400 returns to step 440 to repeat steps 440 to 480 for the next feature. Otherwise, if the most recent feature is the last feature of the component to be inspected, method 400 proceeds to step 495.

In a step 495, method 400 ends. In an example of step 495, robot 110 returns to a home position and user interface 130 indicates that the inspection method 400 is complete and displays a general result to the operator. The images collected in step 440 and results determined in step 460 may be saved to database 190.

In certain embodiments, all of the features that are inspected must pass the feature inspection (e.g., "YES" at step 460 in FIG. 4) for inspection method 400 to provide a pass status for the component. In other words, a single feature failure may result in a fail status for the component. In some embodiments, the order in which steps of method 400 may be varied. For example, steps 420, 430, and 440 may be performed for every fixture of the part or component prior to performing the steps 450-480 to identify failures.

Advantages of the methods disclosed herein include alleviating a need for preprogrammed positions and known reference fixtures. Advantageously, the robot explores and learns each new fixture without programmer intervention and without risking collision of the robot with a fixture. Compared to visual inspections by a human operator manually examining fixtures by sight, the automated methods disclose herein provide higher reliability.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A robotic self-learning visual inspection method, comprising:
   providing a robot having one or more arms each adapted for attaching to one or more of a plurality of tools;

providing a controller configured to instruct the robot to perform the steps of:
- imaging a component using a long-range camera;
- searching images of the component for a fiducial marking to identify a fixture;
- scanning the fixture with a touch probe along (1) a longitudinal direction of the fixture at different transverse positions, and (2) a transverse direction, perpendicular to the longitudinal direction, at different longitudinal positions; and
- determining widths of sections of the fixture between scans with the touch probe via a distance sensor;
- generating a computational model of the fixture based on scanning the fixture and determining the widths of sections;
- retrieving data from a database for the fixture;
- identifying one or more features on the fixture based on the computational model and data from the database;
- capturing close-up images using a short-range camera for collecting detailed information of the one or more features on the fixture;
- comparing the data from the database with data from the close-up images; and
- determining whether each of the one or more features passes inspection based on predetermined criteria.

2. The robotic self-learning visual inspection method of claim 1, further comprising prompting a user to scan a barcode attached to the fixture.

3. The robotic self-learning visual inspection method of claim 1, wherein generating the computational model further comprises:
- generating a plurality of waypoints;
- building an itinerary to provide safe travel for movement of the robot near the fixture based on the plurality of waypoints; and
- validating the itinerary to ensure that the plurality of waypoints are reachable by at least one arm of the robot.

4. The robotic self-learning visual inspection method of claim 1, wherein information extracted from images of the fixture is projected onto the computational model to provide three-dimensional coordinate information of the feature.

5. The robotic self-learning visual inspection method of claim 1, further comprising uploading feature information to the database such that a previously unknown fixture becomes known.

6. The robotic self-learning visual inspection method of claim 1, further comprising examining a feature, wherein the controller processes images from the short-range camera for finding measured locations in the images.

7. The robotic self-learning visual inspection method of claim 1, further comprising:
- pausing the method when a failure is identified by the controller;
- moving a laser via the one or more arms of the robot; and
- illuminating a failure location directly on the fixture with the laser.

8. The robotic self-learning visual inspection method of claim 1, wherein the plurality of tools are selected from a long-range camera, a short-range camera, a barcode scanner, a distance sensor, a touch probe, a light, and a laser.

9. The robotic self-learning visual inspection method of claim 1, wherein the fixture comprises a bond, a fastener, a component edge, or a component corner.

10. The robotic self-learning visual inspection method of claim 1, wherein the feature comprises a slider, a headerboard, a bolt, a bolt slot, a fastener edge, a layup pattern, a seam, a bond, or an overlap.

11. The robotic self-learning visual inspection method of claim 1, comprising determining that the features is out of position based on the predetermined criteria, wherein the predetermined criteria comprises a tolerance limit.

12. The robotic self-learning visual inspection method of claim 1, comprising repeating steps provided by the controller for a plurality of features on the fixture.

13. The robotic self-learning visual inspection method of claim 12, comprising repeating the steps provided by the controller for a plurality of fixtures on a component.

14. The robotic self-learning visual inspection method of claim 13, comprising providing a pass status for the component when the predetermined criteria have been met for the plurality of fixtures on each of the plurality of features.

15. The robotic self-learning visual inspection method of claim 1, comprising moving the robot along a track mounted to a floor for position the one or more arms with respect to the fixture.

16. The robotic self-learning visual inspection method of claim 1, comprising receiving user input about the fixture via a user interface.

17. The robotic self-learning visual inspection method of claim 1, comprising preplacing a fiducial marking on a component, the fiducial marking being configured such that the controller may identify the fixture using one or more of the plurality of tools.

* * * * *